United States Patent
Jia

(10) Patent No.: US 8,724,694 B2
(45) Date of Patent: May 13, 2014

(54) ON-THE SPOT DEBLOCKER IN A DECODING PIPELINE

(75) Inventor: Wei Jia, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 952 days.

(21) Appl. No.: 12/251,221

(22) Filed: Oct. 14, 2008

(65) Prior Publication Data

US 2010/0091836 A1   Apr. 15, 2010

(51) Int. Cl.
*H04N 7/12* (2006.01)
(52) U.S. Cl.
USPC .............. 375/240.01; 375/242; 375/341
(58) Field of Classification Search
USPC .................. 375/240.01, 242, 341
See application file for complete search history.

(56) References Cited

U.S. PATENT DOCUMENTS

| | | | |
|---|---|---|---|
| 6,907,079 B2 | 6/2005 | Gomila et al. | |
| 6,917,310 B2 | 7/2005 | Pearson et al. | |
| 7,372,905 B2 | 5/2008 | Foo et al. | |
| 7,421,025 B2 | 9/2008 | Wang et al. | |
| 7,590,059 B2 | 9/2009 | Gordon | |
| 7,796,692 B1 | 9/2010 | Falardeau et al. | |
| 7,796,792 B2 | 9/2010 | Behiels | |
| 8,116,379 B2 | 2/2012 | Dang | |
| 2006/0078052 A1 | 4/2006 | Dang | |
| 2006/0115002 A1* | 6/2006 | Kim et al. | 375/240.29 |
| 2006/0285757 A1 | 12/2006 | Abe et al. | |
| 2008/0056350 A1 | 3/2008 | Lyashevsky et al. | |
| 2008/0101718 A1 | 5/2008 | Yang et al. | |
| 2008/0123750 A1 | 5/2008 | Bronstein et al. | |
| 2008/0159407 A1 | 7/2008 | Yang et al. | |
| 2008/0240253 A1 | 10/2008 | Au et al. | |
| 2008/0298473 A1 | 12/2008 | Gou | |
| 2009/0003447 A1 | 1/2009 | Christoffersen et al. | |
| 2009/0010326 A1 | 1/2009 | Rossholm et al. | |
| 2009/0016430 A1 | 1/2009 | Schmit et al. | |
| 2009/0129478 A1 | 5/2009 | Meroth | |
| 2009/0304085 A1 | 12/2009 | Avadhanam et al. | |
| 2012/0189067 A1 | 7/2012 | Dang | |

FOREIGN PATENT DOCUMENTS

| | | |
|---|---|---|
| JP | 11205792 | 7/1999 |
| JP | 2002501691 | 1/2002 |
| JP | 2006174138 A2 | 4/2006 |
| JP | 2007251881 | 9/2007 |
| JP | 2008533863 | 8/2008 |
| KR | 1020000082892 | 5/2002 |
| KR | 1020020053336 A | 5/2002 |
| KR | 1020020053336 A | 7/2002 |
| TW | 200643825 | 12/2006 |
| WO | 2006013854 A1 | 9/2006 |

OTHER PUBLICATIONS

Cheng et al. "An In-Place Architecture for the Deblocking Filter in H.264/AVC", pp. 530-535.*

(Continued)

*Primary Examiner* — Shewaye Gelagay

(57) ABSTRACT

A decoder pipeline may include a decoding (prior to deblocking) stage followed by a deblocking stage. A memory can be coupled to the decoder pipeline. A decoded first macroblock can be output from the decoding stage directly into the deblocking stage, bypassing the memory, if a decoded second macroblock depended on to deblock the first macroblock is already deblocked. Otherwise, the decoded first macroblock is stored in the memory until the second macroblock is deblocked and available to deblock the first macroblock.

19 Claims, 7 Drawing Sheets

(56) References Cited

OTHER PUBLICATIONS

Schoffmann, et al., "An Evaluation of Parallelization Concepts for Baseline-Profile Compliant H.264/AVC Decoders".
Huang et al., "Architecture Design for Deblocking Filter in H.264/JVT/AVC".
Chen et al., "Architecture Design of H.264/AVC Decoder With Hybrid Task Pipelining for High Definition Videos".
Zhongkang Lu et al., "An Adaptive Deblocking Filter for ROI-Based Scalable Video Coding", IEEE Multimedia and Expo, pp. 1347-1350 (Jul. 2007).

* cited by examiner

70

| MB0 0 | MB1 0 | MB2 0 | MB3 0 |
|---|---|---|---|
| MB4 0 | MB5 0 | MB6 0 | MB7 0 |
| MB8 0 | MB9 0 | MB10 0 | MB11 0 |

FIG. 7A

| MB0 0* | MB1 0* | MB2 0* | MB3 0* |
|---|---|---|---|
| MB4 0 | MB5 0 | MB6 0 | MB7 0 |
| MB8 0 | MB9 0 | MB10 0 | MB11 0 |

FIG. 7B

| MB0 0* | MB1 0* | MB2 0* | MB3 0* |
|---|---|---|---|
| MB4 0 | MB5 0 | MB6 1 | MB7 1 |
| MB8 0 | MB9 0 | MB10 0 | MB11 0 |

FIG. 7C

| MB0 0* | MB1 0* | MB2 0* | MB3 0* |
|---|---|---|---|
| MB4 0 | MB5 0 | MB6 1 | MB7 1 |
| MB8 1 | MB9 1 | MB10 0 | MB11 0 |

FIG. 7D

ON-THE SPOT DEBLOCKER IN A DECODING PIPELINE

RELATED U.S. APPLICATIONS

This application is related to the copending U.S. Patent Application with Ser. No. 12/250,809, filed Oct. 14, 2008, entitled "A Second Deblocker in a Decoding Pipeline," assigned to the assignee of the present invention, and hereby incorporated by reference. This application is also related to the copending U.S. Patent Application with Ser. No. 12/251,326, filed Oct. 14, 2008, entitled "Adaptive Deblocking in a Decoding Pipeline," assigned to the assignee of the present invention, and hereby incorporated by reference.

FIELD

Embodiments according to the present invention generally relate to video decoding (video decompression).

BACKGROUND

H.264, also known as Moving Pictures Experts Group-4 (MPEG-4) Part 10 or MPEG-4 Advanced Video Coding (AVC), is a standard for video compression. A video includes a series of pictures (or frames), with each frame consisting of a two-dimensional array of pixels. The pixels are divided into macroblocks (a 16×16 array of pixels). Each macroblock has a macroblock number; in general, the macroblocks are consecutively numbered starting at the top-left of the frame, increasing monotonically from left-to-right and top-to-bottom. The macroblocks can be grouped into slices, and the slices can be grouped into slice groups. Macroblocks within a slice are arranged in ascending order by macroblock number. A slice can include any number of macroblocks, which may or may not be contiguous; that is, macroblocks in one slice may be interspersed among macroblocks of one or more other slices of other slice groups, although macroblocks from slices in the same slice group are not interspersed with each other.

The feature of H.264 that allows macroblocks to be grouped into slices as just described is generally referred to as flexible macroblock ordering (FMO). FMO is one of the error resiliency tools that can be used by a decoder to conceal errors if slices are lost or corrupted during transmission. Macroblocks in a missing or corrupted slice can be reconstructed by interpolating or extrapolating macroblock information from another slice.

Another H.264 feature is generally referred to as arbitrary slice ordering (ASO). With ASO, slices can be transmitted in any order. For example, a slice may be sent as soon as it is ready—that is, a slice may be streamed to a decoder as soon as all of the macroblocks that make up that slice are encoded. As a result, a slice from one slice group may be sent, followed by a slice from another slice group, followed by another slice from the first slice group, and so on.

Thus, generally speaking, H.264 allows encoded macroblocks to be sent "out of order." That is, the macroblocks may be encoded in a particular order (e.g., from top-to-bottom and from left-to-right, in ascending order according to macroblock number), but the order in which the macroblocks are sent to, and hence received by, a decoding device may be different from the encoding order.

In addition to basic decoding operations, decoding devices perform deblocking operations. In deblocking, a deblocking filter is applied to decoded macroblocks in order to smooth the boundaries between adjacent macroblocks.

With reference to FIG. 1, in order to deblock macroblock M1, information may be needed for macroblock M2 (the nearest neighbor on the left of macroblock M1) and perhaps for macroblock M3 (the nearest neighbor above macroblock M1). However, macroblock M1 may be in one slice (e.g., slice S2) and the neighboring macroblocks M2 and M3 may be in a different slice (e.g., slice S1) or slices. With ASO enabled, slice S2 may be sent to the decoder before slice S1. Thus, macroblock M1 may be ready for deblocking, but deblocking may have to be delayed if slice S1 has not yet arrived at the decoder.

As a result, H.264 decoding is typically implemented using a two-pass approach. In the first pass, basic decoding (decoding prior to deblocking) is performed and the decoded data is saved as it is decoded. In the second pass, the decoded data is reloaded and deblocking is performed. Unfortunately, this type of implementation can place additional burdens on decoding devices. More specifically, decoding devices may need higher data bus bandwidths to accommodate the transfers of data to and from memory, additional memory to store the decoded data prior to deblocking, and longer computing times because the first and second passes are performed sequentially.

SUMMARY

According to embodiments of the present invention, a decoder pipeline includes a decoding (prior to deblocking) stage followed by a deblocking stage. A memory can be coupled to the decoder pipeline. A decoded first macroblock can be output from the decoding stage directly into the deblocking stage, bypassing the memory, if a decoded second macroblock depended on to deblock the first macroblock is already deblocked. Otherwise, the decoded first macroblock is stored in the memory until the second macroblock is deblocked and available to deblock the first macroblock.

More specifically, within a frame classified as an out-of-order frame, there can be sequences of macroblocks that are in order. In some circumstances, the sequences of in-order macroblocks in an out-of-order frame can be deblocked on-the-spot.

In one such embodiment, a particular macroblock in a frame can be deblocked when all macroblocks that precede it in the frame have been decoded and deblocked. On the other hand, if not all of the macroblocks preceding a particular macroblock have been fully decoded, then the particular macroblock is stored and subsequently reloaded for deblocking when all of the preceding macroblocks have been fully decoded. After a macroblock is deblocked, it can in turn be used to deblock a following macroblock that has been decoded but not deblocked, which in turn can be used to deblock another following macroblock that has been decoded but not deblocked, and so on, until all macroblocks eligible for deblocking have been deblocked.

Thus, according to an embodiment of the invention, macroblocks can be deblocked as soon as they are eligible to be deblocked. On-the-spot deblocking can be achieved for some macroblocks that are in an out-of-order (e.g., ASO/FMO) frame. Accordingly, the amount of bus traffic can be reduced because it is not necessary to transfer all macroblocks in such a frame to and from memory, and the amount of memory consumed is also reduced. Furthermore, computing time can be reduced because decoding and deblocking can be accomplished in parallel—while one macroblock is being decoded, another macroblock can be deblocked.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

FIGS. 7A, 7B, 7C and 7D illustrate an example of an array that can be used to track macroblock status according to an embodiment of the invention.

DETAILED DESCRIPTION

Figures 1, 2:
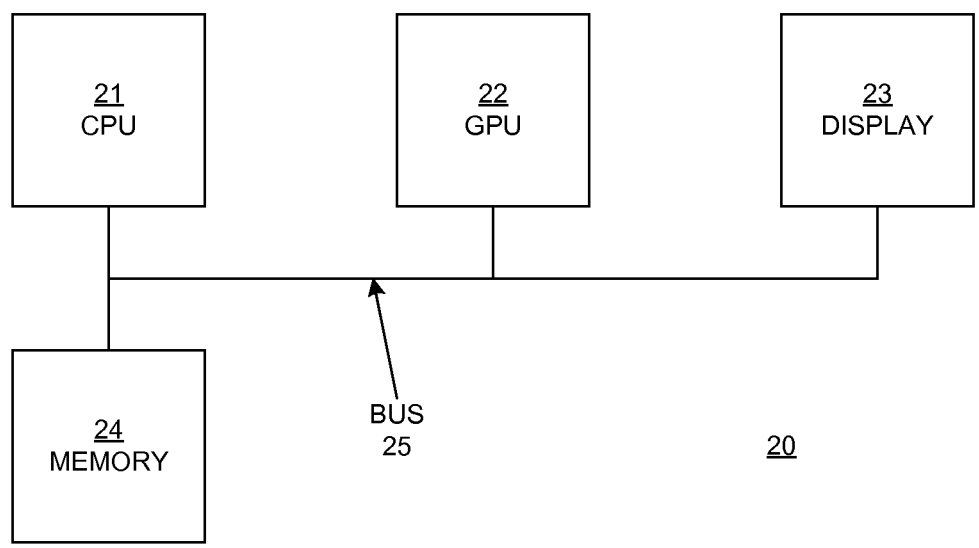
FIG. 1 illustrates an array of macroblocks.
FIG. 2 is a block diagram of an example of a system upon which a decoder in accordance with embodiments of the invention can be implemented.

Reference will now be made in detail to embodiments in accordance with the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "encoding," "decoding," "deblocking," "receiving," "sending," "forwarding," "identifying," "determining," "classifying," "comparing," "selecting," "storing," "processing," "using," "initializing," "setting," "flagging," "accessing," "associating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIGS. 5, 6, 8 and 9 are flowcharts of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

The flowcharts of FIGS. 5, 6, 8 and 9 can be implemented as computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

FIG. 2 is a block diagram of an example of a system 20 upon which a decoder in accordance with the present invention can be implemented. In the example of FIG. 2, the system includes a host central processing unit (CPU) 21 coupled to a graphics processing unit (GPU) 22 via a bus 25. The GPU may also be referred to as a media processing unit (MPU). Both the CPU and the GPU are coupled to a memory 24. In the example of FIG. 2, the memory is a shared memory, whereby the memory stores instructions and data for both the CPU and the GPU. Alternatively, there may be separate memories dedicated to the CPU and GPU, respectively. The memory can also include a video frame buffer for storing pixel data that drives a coupled display 23.

Generally speaking, the system 20 includes the basic components of a computer system platform that implements functionality in accordance with embodiments of the present invention. The system 20 can be implemented as, for example, any of a number of different types of computer systems (e.g., laptops, desktops and notebooks), as well as a home entertainment system (e.g., a DVD player) such as a set-top box or digital television, a portable or handheld electronic device (e.g., a portable phone, personal digital assistant, or handheld gaming device), or virtually any other type of device with display capability.

Figure 3:
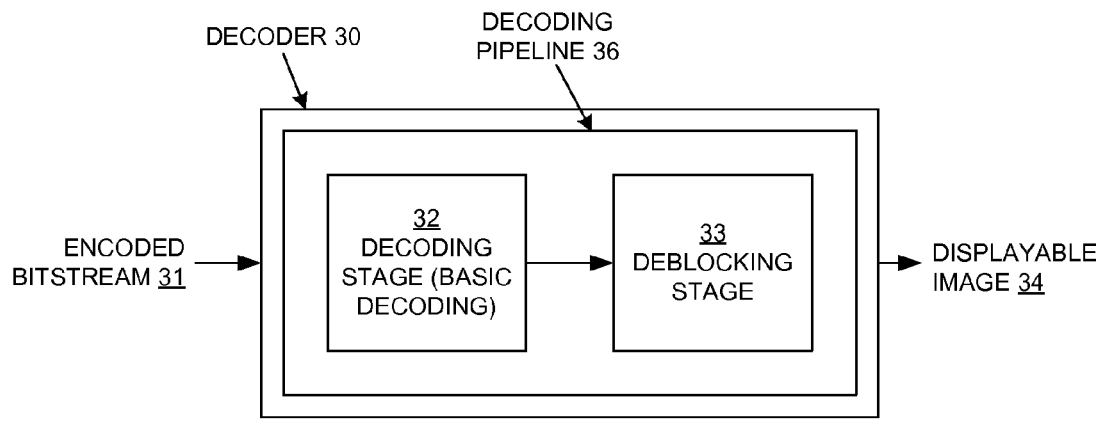
FIG. 3 is a block diagram showing elements of a decoding pipeline according to one embodiment of the invention.

FIG. 3 is a block diagram showing elements of a decoder 30 according to one embodiment of the present invention. In general, the decoder receives an encoded bitstream 31, decodes the data in the bitstream, and produces displayable image data 34.

In one embodiment, raw image data (e.g., video data) is compressed using some type of compression scheme to generate a set of encoding parameters such as, but not limited to, frame type (e.g., intra-coded I-frame, predicted P-frame or bi-predicted B-frame), macroblock prediction mode (e.g., inter-block versus intra-block), transform (e.g., discrete cosine transform) coefficients, texture coefficients, and motion vector information. The encoding parameters are then translated into variable length codes (VLCs), using Huffman coding for example. The encoded bitstream is a serialized bitstream containing the VLCs.

The decoder essentially reverses the encoding process to reconstruct the image data. In the example of FIG. 3, the decoder includes a decoding pipeline 36 that includes a decoding stage 32 and a deblocking stage 33.

The decoding stage performs basic decoding operations such as variable length decoding, inverse quantization, inverse transform, and motion compensation. In general, the decoding stage parses the encoded bitstream to extract the VLCs, and then translates the VLCs to reproduce the encoding parameters referred to above. The encoding parameters are in turn used to reconstruct the original video data (more specifically, a version of the original video data is constructed).

The deblocking stage applies a deblocking filter to decode macroblocks in order to smooth the boundaries between adjacent macroblocks when the reconstructed image is rendered (displayed). For example, a deblocking filter may employ the weighted averages of pixel values at or near the boundary of adjacent macroblocks to blend the macroblocks along the boundary, thereby removing artifacts that may be introduced by the compression (encoding) process that, if not removed, may cause the reconstructed image to appear blockish. In one embodiment, the deblocking stage includes two deblockers, which are described further in conjunction with FIG. 4, below.

In the discussion that follows, unless otherwise noted, a "decoder" refers to an element (e.g., a stand-alone or peripheral device, or an integrated system) that performs both decoding and deblocking. "Decoding," unless otherwise noted, refers to the basic decoding operations referred to above (e.g., variable length decoding, inverse quantization, inverse transform, and motion compensation). The terms "fully decoded data" and "completely decoded data," unless otherwise noted, refer to data that has been both decoded and deblocked.

A Second Deblocker in a Decoding Pipeline

Figure 4:
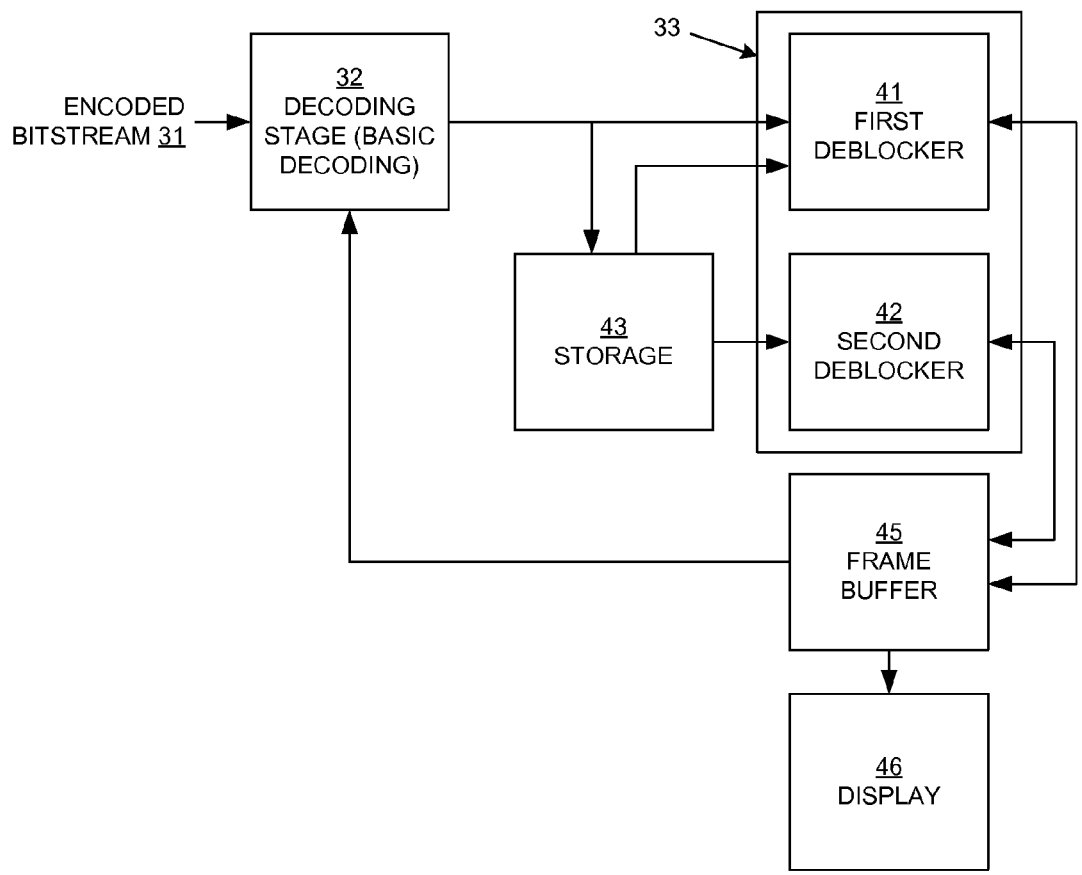
FIG. 4 is a block diagram showing elements of a decoder according to an embodiment of the invention.

FIG. 4 is a block diagram showing elements of a decoder coupled to a frame buffer 45 and a display 46 according to one embodiment of the present invention. In the example of FIG. 4, the decoder includes a decoding stage 32 and a deblocking stage 33. The deblocking stage includes a first deblocker 41 and a second deblocker 42. The path from the decoding stage through the first deblocker may be referred to herein as the primary path through the decoding pipeline, while the path from the decoding stage through the second deblocker may be referred to herein as the secondary path through the decoding pipeline. In one embodiment, a storage element 43 is coupled between the output of the decoding stage and the input of the second deblocker, and is also coupled to the input of the first deblocker.

The outputs of the first and second deblockers are stored in the frame buffer. The contents of the frame buffer can be subsequently rendered on the display and/or used to decode another frame. In the latter case, once a frame (e.g., a reference frame such as an I-frame or a P-frame or perhaps a B-frame—according to H.264, a B-frame can be used as a reference frame) is decoded, it may be relied upon to decode one or more subsequent frames (e.g., another P-frame or a B-frame). Each frame relied upon by other frames for decoding can be held in the frame buffer so that it is available when those other frames are decoded. In some implementations, memory other than the frame buffer may be used to store frames relied upon for decoding other frames.

The first and second deblockers can operate in parallel with each other and also in parallel with the decoding stage. For example, the first deblocker can be deblocking one frame while the second deblocker is deblocking another frame and while the decoding stage is operating on yet another frame. Furthermore, in some instances, a deblocker may be operating on one portion of a frame while the decoding stage is operating on a subsequent portion of the same frame. In other words, under some circumstances, macroblocks in a frame may be decoded, input directly into the first deblocker, and deblocked on-the-spot, in parallel with the decoding of other macroblocks in the frame. Additional information with regard to on-the-spot deblocking is provided in conjunction with FIGS. 6, 8 and 9.

The introduction of a second, stand-alone deblocker means that, under circumstances elaborated on below, deblocking of some frames can be offloaded from the primary path to a parallel, secondary path. Processing time is reduced, improving overall performance.

Figure 5:
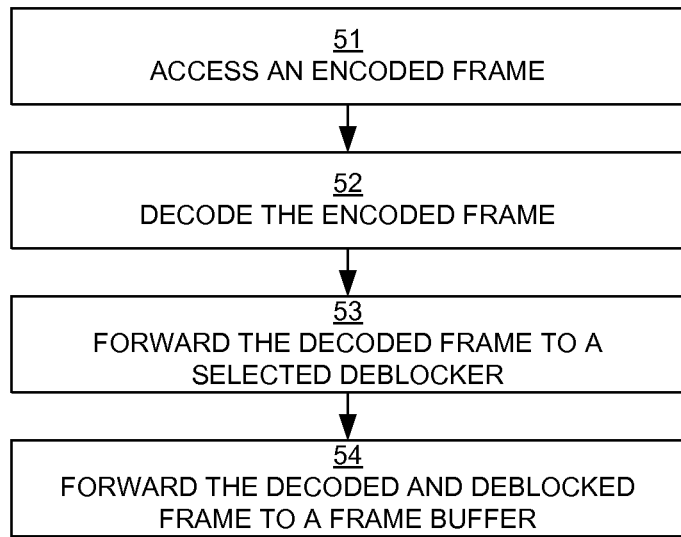
FIG. 5 is a flowchart of an example of a computer-implemented method for processing data using a second deblocker according to an embodiment of the invention.

In general, the decoder of FIG. 4 operates as outlined in the flowchart of FIG. 5, which shows a computer-implemented method of processing data using a second deblocker according to an embodiment of the invention. In block 51 of FIG. 5, an encoded frame is received as an input to the first stage (the basic decoding stage) of a decoder. In block 52, the encoded frame is decoded to produce a decoded frame (decoded prior to deblocking).

In block 53, the decoded frame is forwarded to either the first deblocker or to the second deblocker so that it can be deblocked. In one embodiment, the decoded frame is forwarded to either the first deblocker or to the second deblocker depending on how the decoded frame is classified. If the decoded frame is classified as a first type of frame, it is sent to the first deblocker; otherwise, the decoded frame is classified as a second type of frame and sent to the second deblocker. Additional information regarding the classification of frames is provided in conjunction with FIG. 6.

In block 54 of FIG. 5, the completely decoded (both decoded and deblocked) frame is forwarded to a frame buffer so that it can be used to reconstruct a subsequent frame and/or rendered for viewing.

Adaptive Deblocking in a Decoding Pipeline

Figure 6:
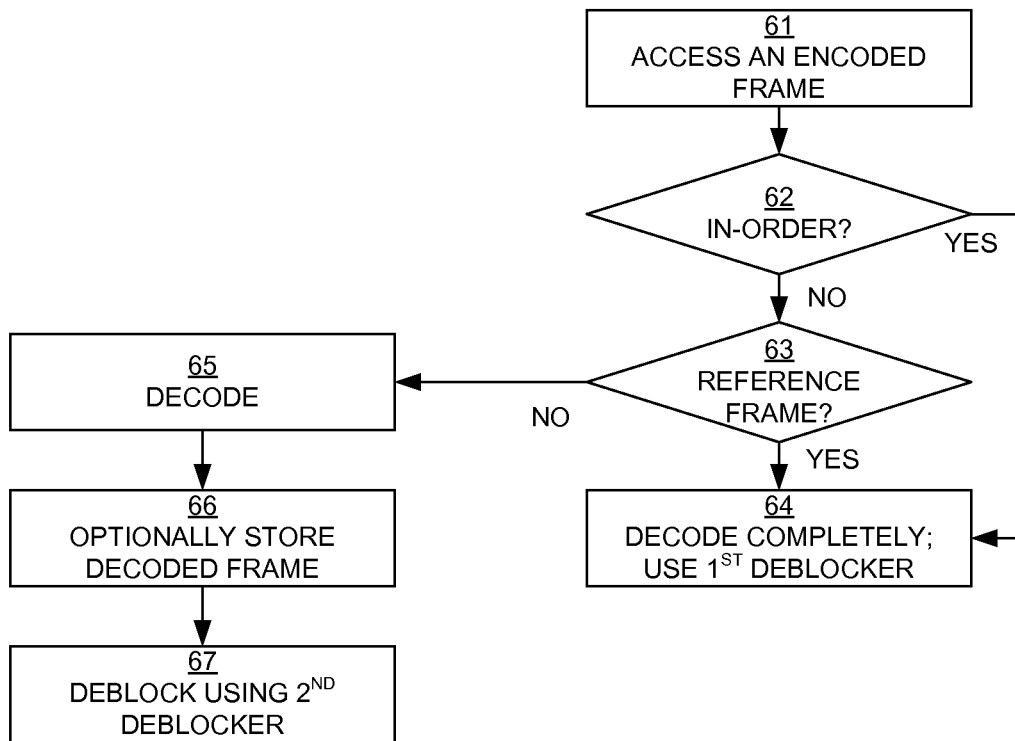
FIG. 6 is a flowchart of an example of a computer-implemented method for processing data using a second deblocker in an adaptive manner according to an embodiment of the invention.

In one embodiment, the decoder of FIG. 4 operates in an adaptive manner as outlined in the flowchart of FIG. 6, which shows a computer-implemented method of processing data using a second deblocker according to an embodiment of the invention. In block 61, a decoder accesses an encoded frame.

In block 62, a determination is made with regard to whether the frame is an "in-order frame" or an "out-of-order frame." As used herein, an in-order frame is a frame that contains macroblocks that are arranged in a prescribed order—if the arrangement of macroblocks in a frame satisfies a particular predefined order, then the frame is classified as an in-order frame; otherwise, the frame is classified as an out-of-order frame. Frames that are encoded using flexible macroblock ordering (FMO) and/or arbitrary slice ordering (ASO), previously described herein, are examples of out-of-order frames.

Frame headers may not include information that can be used to identify frames as FMO/ASO frames or as in-order frames versus out-of-order frames. However, in one embodiment, the macroblock numbers associated with each macroblock in the frame can be used to deduce whether a frame is an in-order frame or an out-of-order frame, in the manner about to be described.

Generally speaking, the macroblock numbers coincide with the order in which the macroblocks are encoded. For example, macroblocks may be numbered consecutively starting at the top-left macroblock of the frame, increasing monotonically from left-to-right and top-to-bottom. The macroblocks are also, in general, encoded starting with the top-left macroblock of the frame, proceeding from left-to-right and top-to-bottom (sometimes referred to as "raster scan order"). Thus, if the macroblocks in an encoded frame are received at a decoder in the order in which they were encoded, then the macroblock numbers in the frame will be in order.

Accordingly, in one embodiment, if the macroblock numbers in the encoded version of a frame (and therefore in the decoded version of the frame) are in numerical order, then the frame is an in-order frame; otherwise, the frame is an out-of-order frame. In one embodiment, when the decoder receives a macroblock in a frame (the "macroblock of interest," also referred to herein as the "current macroblock"), the decoder compares the macroblock number for the macroblock of interest against the macroblock number for the macroblock that was received just ahead of the macroblock of interest. In other words, the decoder can compare the macroblock numbers of macroblocks in the order in which the macroblocks are received at the decoder, as follows:

if $MB\_ID_{i+1} = MB\_ID_i + 1$ for all $i = 0, 1, \ldots, N-1$, then the frame is in-order; otherwise, the frame is out-of-order;

where "MB_ID" is a macroblock number, "i" corresponds to the order in which the macroblocks are received, and "N" is the number of macroblocks in the frame.

Continuing with reference to FIG. 6, if the frame is classified as an out-of-order frame, then the flowchart proceeds to block 63; otherwise, the flowchart advances to block 64.

In block 63, a determination is made with regard to whether the out-of-order frame is a "reference frame" or a "non-reference frame." As used herein, a reference frame is a frame that is relied upon by another frame for decoding. Examples of reference frames are I-frames and P-frames (sometimes referred to as I-pictures and P-pictures). According to H.264, a B-frame can be used as a reference frame. As used herein, a non-reference frame is a frame that is not a reference frame. A B-frame (or B-picture) is an example of a non-reference frame. A frame header that is associated with each frame conventionally includes information that identifies a frame as an I-frame, P-frame or B-frame.

If the frame is classified as a reference frame, then the flowchart proceeds to block 64; otherwise, the flowchart proceeds to block 65.

In block 64, an in-order reference frame or in-order non-reference frame is completely decoded (basic decoding plus deblocking) using the first deblocker of FIG. 4. That is, the frame is deblocked "on-the-spot"—the frame is not necessarily stored in memory prior to deblocking, in contrast to the manner in which out-of-order non-reference frames are processed (see blocks 65, 66 and 67 of FIG. 6).

If the frame is an in-order reference frame or an in-order non-reference frame, then deblocking can occur as the frame is decoded. Generally speaking, in order to be classified as an in-order frame, all of the macroblocks in the frame are in order as described above. With reference back to FIG. 1, in order to deblock macroblock M1, information from the macroblocks M2 and M3 (e.g., the nearest neighbor to the left of the macroblock and/or the nearest neighbor above the macroblock) is utilized. As a general rule, in an in-order frame, both macroblock M2 and macroblock M3 will be decoded and deblocked before macroblock M1 is ready for deblocking, regardless of the location of macroblock M1 in the frame.

Generally speaking, in an in-order frame, the macroblock(s) relied on to deblock a particular macroblock will be decoded and deblocked in time to deblock the particular macroblock. Thus, an in-order frame can be deblocked on-the-spot—as each macroblock in the frame is decoded, the decoded macroblock can be forwarded directly to the first deblocker and deblocked immediately after basic decoding.

While processing an in-order frame, one macroblock can be deblocked while the next macroblock is being decoded. Similarly, once all the macroblocks in one frame have been decoded, the decoding stage of the pipeline can begin to decode macroblocks in the next frame, even while macroblocks in the preceding frame are being deblocked. That is, the deblocking stage may be processing the latter macroblocks of one frame while the decoding stage is processing the first macroblocks of the next frame.

In block 65 of FIG. 6, an out-of-order non-reference frame is decoded (basic decoding only). At this point, the decoding stage of FIG. 4 becomes available to begin decoding the next frame.

In block 66 of FIG. 6, a decoded out-of-order non-reference frame is optionally stored in the storage element 43 of FIG. 4. When the frame is an out-of-order non-reference frame, it may be necessary to store some or all of the decoded macroblocks in the frame until other macroblocks needed to deblock those macroblocks are also decoded. Furthermore, non-reference frames are not relied upon to decode another frame, and so deblocking can be postponed if it is advantageous to do so for some reason. In block 67, an out-of-order non-reference frame is deblocked using the second deblocker of FIG. 4.

Thus, after basic decoding of an out-of-order non-reference frame is accomplished, the decoded data is passed to the second deblocker for deblocking. At the same time, the primary decoding path is available to decode the next frame. That is, while an out-of-order non-reference frame is being deblocked, the next frame can be decoded in parallel (overlapping in time) with the deblocking. In this manner, non-reference frame decoding, even with FMO/ASO enabled, can be performed as fast as in-order frame decoding. In general, the majority of frames in a video sequence are non-reference frames. Therefore, by processing non-reference frames at a rate comparable to in-order decoding, the overall performance of the decoding pipeline can be significantly improved.

To summarize the embodiment of FIG. 6, if a decoded frame is classified as a reference frame (regardless of whether the macroblocks in the frame are in order or out-of-order), then the decoded frame is sent directly to the first deblocker for on-the-spot deblocking. If a decoded frame is classified as an in-order non-reference frame, then the decoded frame is also sent directly to the first deblocker for on-the-spot deblocking. Also, if a decoded frame is classified as an out-of-order non-reference frame, then it is sent to the second deblocker. In other words, according to the embodiment just described, the first deblocker deblocks reference frames (in-order or out-of-order) and in-order non-reference frames, and the second deblocker deblocks out-of-order non-reference frames.

Thus, according to an embodiment of the invention, it is possible to distinguish between in-order and out-of-order frames in addition to distinguishing between reference and non-reference frames. In other words, based on real-time input data, it is possible to detect (more specifically, deduce) ASO/FMO encoding on-the-fly and then adapt the decoding approach (specifically, the deblocking approach) accordingly. Real-time detection of ASO/FMO can be especially important in achieving low-delay processing in communication applications in which the arrival order of slices in a frame is not guaranteed. Embodiments described herein can perform in-order decoding when ASO/FMO is not used and reduce processing delays when ASO/FMO is used, without a priori knowledge about whether or not ASO/FMO is being used.

According to an embodiment of the invention, a second deblocker is introduced into a decoding pipeline so that, for some types of frames, the deblocking task can be offloaded from the primary decoding path (the path that includes the first deblocker) to a parallel, secondary path (the path that includes the second deblocker). As a result, the first deblocker is in effect reserved for deblocking the more essential frames (e.g., reference frames). Consequently, deblocking of the more essential frames can be performed more quickly. Furthermore, the first deblocker is also effectively reserved for deblocking frames that can be deblocked on-the-spot (e.g., in-order frames). Because on-the-spot deblocking is accomplished as macroblocks are decoded, the use of the first deblocker for on-the-spot deblocking does not introduce any delays into the decoding pipeline.

By utilizing two deblockers to handle different types of frames, frame decoding and deblocking can be accomplished more quickly overall, because decoding and deblocking can be accomplished using the pipeline path that is the fastest for each particular frame type. In addition, the use of on-the-spot deblocking for reference frames and in-order frames reduces traffic across data buses and also reduces the amount of stored data because it is not necessary to store and fetch decoded data as in a conventional two-pass implementation. Generally speaking, the use of a second deblocker improves overall decoder performance.

The second deblocker does not necessarily have to be implemented using a dedicated processor or other dedicated hardware resources. The second deblocker can be implemented using, for example, a GPU or CPU that may be idling. In other words, on some if not most occasions, the second deblocker may not be acting on time-critical frames, and so its functionality can be provided using existing hardware resources when those resources become available.

On-The-Spot Deblocking of Macroblocks in a Frame

In the discussion of FIG. 6 above, reference frames and in-order non-reference frames can be deblocked on-the-spot (immediately after decoding), but out-of-order non-reference frames are decoded, stored and then deblocked at a later time. However, within a frame classified as an out-of-order frame, there can be sequences of macroblocks that are in order. In some circumstances, the sequences of in-order macroblocks in an out-of-order frame can be deblocked on-the-spot.

Specifically, a particular macroblock in a frame can be deblocked when all macroblocks that precede it in the frame have been decoded and deblocked (fully decoded). On the other hand, if not all of the macroblocks preceding a particular macroblock have been fully decoded, then the particular macroblock is stored and subsequently reloaded for deblocking when all of the preceding macroblocks have been fully decoded, in a manner similar to that described above at the frame level. After a macroblock is deblocked, it can in turn be used to deblock a following macroblock that has been decoded but not deblocked, which in turn can be used to deblock another following macroblock that has been decoded but not deblocked, and so on, until all macroblocks eligible for deblocking have been deblocked.

FIG. 7A is an example of an array 70 that can be used to track the deblocking status of the macroblocks in a frame. The array contains a bit value for each macroblock in the frame. The bit value is set to identify which macroblocks have been decoded but not deblocked. If the bit for a macroblock is not set, then that macroblock has either not yet been decoded or has been decoded and deblocked. In other words, the bit is set to identify macroblocks that are candidates for deblocking.

In the example of FIG. 7A, the array includes a four-by-three array of bit values. FIG. 7A represents only a portion of a frame of video data; in general, a frame includes many more than 12 macroblocks. Initially, all of the bit values are set to the same binary value (e.g., zero). After a frame has been completely decoded, then the array is re-initialized.

FIG. 7B is an example of the array at some later time after the macroblocks M0, M1, M2 and M3 have been decoded and deblocked. In the example of FIG. 7B, macroblocks M0, M1, M2 and M3 are in the same slice (slice S1), and are received at a decoder in the order in which they were encoded (e.g., in the following order: M0, M1, M2, M3). Macroblock M0 can be decoded and deblocked on-the-spot because it does not rely on another macroblock in the current frame for deblocking. On-the-spot deblocking is performed using the first deblocker of FIG. 4, along the primary path through the decoding pipeline.

Macroblock M1 can then be decoded and deblocked on-the-spot using the first deblocker because, in the current frame, it relies only on macroblock M0 for deblocking. Generally speaking, all of the macroblocks needed to deblock macroblock M1 have been decoded and deblocked. In other words, all of the macroblocks that precede macroblock M1 in encoding order have been received and deblocked. The same generalization is applicable in turn to macroblocks M2 and M3, and therefore those macroblocks are also decoded and deblocked on-the-spot using the first deblocker. In the figures, an asterisk is used to indicate that macroblocks M0, M1, M2 and M3 have been decoded and deblocked. In actual practice, there is no need to make such a distinction.

Following slice S1, slice S2 consisting of macroblocks M6 and M7 is received at the decoder. That is, the macroblocks are not received in order. Macroblocks M6 and M7 can be decoded but not deblocked because all of the macroblocks that precede macroblocks M6 and M7 in encoding order (e.g., macroblocks M4 and M5) have not yet been received and deblocked. Accordingly, the bit values corresponding to the macroblocks M6 and M7 are set (e.g., to a value of one) in the array, as shown in FIG. 7C. Also, the decoded macroblocks M6 and M7 are stored in memory (e.g., the storage element 43 of FIG. 4).

Following slice S2, slice S3 consisting of macroblocks M8 and M9 is received at the decoder. Macroblocks M8 and M9 can be decoded but not deblocked because all of the macroblocks that precede macroblocks M8 and M9 have not yet been received and deblocked (at this point, macroblocks M4 and M5 are not yet deblocked). Accordingly, the bit values corresponding to the macroblocks M8 and M9 are set (e.g., to a value of one) in the array, as shown in FIG. 7D.

Following slice S3, slice S4 consisting of macroblocks M4 and M5 is received at the decoder. Macroblock M4 can be decoded and deblocked on-the-spot in the first deblocker because all of the macroblocks that precede it in encoding order (namely, macroblocks M0, M1, M2 and M3) have been decoded and deblocked. After macroblock M4 is deblocked, macroblock M5 can be decoded and deblocked on-the-spot in the first deblocker.

Furthermore, once macroblock M5 is deblocked, all of the macroblocks preceding macroblock M6 will have now been deblocked, and so macroblock M6 can be retrieved from storage and deblocked. In this case, macroblock M6 is deblocked using the first deblocker of FIG. 4, along the primary path through the decoding pipeline. Once macroblock M6 is deblocked, macroblock M7 can be retrieved from storage and deblocked using the second deblocker, and so on through macroblock M9. In this example, macroblocks M10 and M11 are not deblocked at this time even though all preceding macroblocks have been decoded and deblocked because macroblocks M10 and M11 themselves have not yet been received and decoded. Once macroblocks M10 and M11 are received, they can be decoded and deblocked on-the-spot using the first deblocker of FIG. 4.

According to the embodiment just discussed, a macroblock can have one of three states: not yet decoded (incomplete basic decoding); decoded but not deblocked; and decoded and deblocked. However, only one binary bit having two states is needed to indicate the status of each macroblock, because the array is used to identify the macroblocks that are candidates for deblocking (those macroblocks that have been decoded but not deblocked). For the purpose of identifying macroblocks for deblocking, it is not necessary to distinguish macroblocks that have not yet been decoded from those that have been decoded and deblocked.

Figure 8:
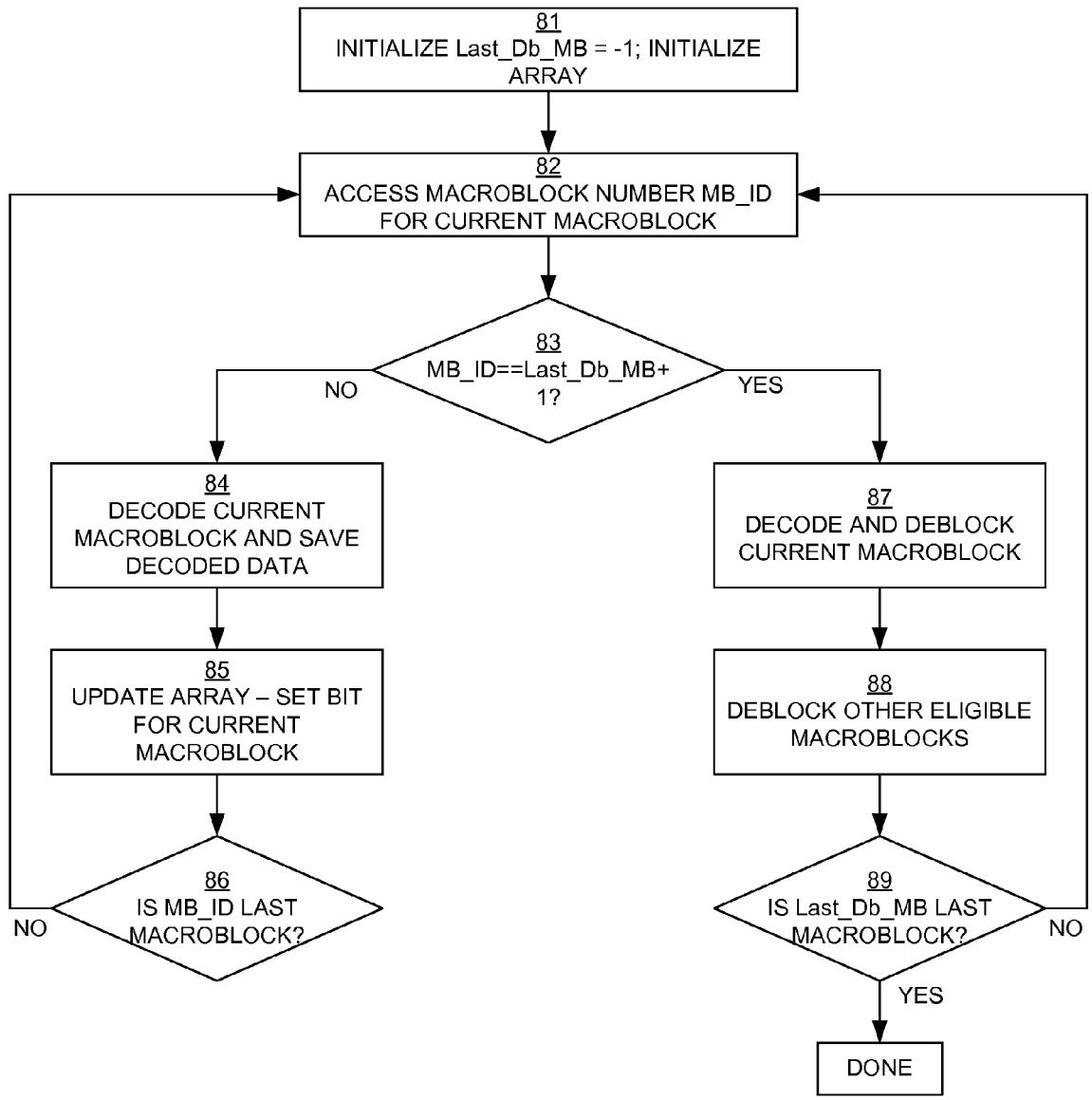
FIG. 8 is a flowchart of an example of a computer-implemented method for deblocking macroblocks according to an embodiment of the invention.

FIG. 8 is a flowchart of a computer-implemented method for deblocking macroblocks on-the-spot according to an embodiment of the invention. In block 81, a variable "Last_Db_MB" (for last deblocked macroblock) is initialized to a value of −1 (negative one). The array of FIG. 7A is also initialized as described previously herein.

In block 82, the macroblock number ("MB_ID") for the current macroblock M is accessed. In block 83, the value of MB_ID is compared to the value of Last_Db_MB incremented by a value of one (Last_Db_MB+1). In effect, block 83 is used to determine whether the macroblocks are being received in-order or out-of-order and, if in-order, whether the immediately preceding macroblock M−1 was completely decoded (decoded and deblocked). If the value of MB_ID is equal to Last_Db_MB+1, then the current macroblock M is the next macroblock following the last macroblock Last_Db_MB that was deblocked—that is, the macroblock number for the current macroblock M and the macroblock number for the last deblocked macroblock Last_Db_MB are consecutive numbers—and the flowchart proceeds to block 87. Otherwise, the macroblocks are being received out-of-order or the current macroblock M is not the next macroblock following the last deblocked macroblock Last_Db_MB—that is, the current macroblock M is separated from the last deblocked macroblock Last_Db_MB by one or more macroblocks that have not been deblocked—and the flowchart proceeds to block 84.

In block 84, the current macroblock M is decoded (but not deblocked) and the decoded data is saved (e.g., in the storage element 43 of FIG. 4). In block 85, the current macroblock M is flagged as being decoded but not deblocked. In one embodiment, a bit value corresponding to the current macroblock M is set in an array, as described above in conjunction with FIGS. 7A-7D.

In block 86 of FIG. 8, if the current macroblock M is not the last macroblock in the frame, then the flowchart returns to block 82 (unless there is some sort of error, the flowchart of FIG. 8 will always return to block 82 at this point).

In block 87, the current macroblock M is decoded and deblocked on-the-spot using the first deblocker of FIG. 4. As discussed above, a macroblock can be deblocked if all macroblocks preceding it in encoding order have also been deblocked. If the macroblock M−1 immediately preceding the current macroblock M has been deblocked (as determined in block 83 of the flowchart), then the current macroblock M can be deblocked. In other words, to have been deblocked, the macroblock M−1 will have satisfied the condition that all preceding macroblocks have been deblocked; because the current macroblock M immediately follows the macroblock M−1, it too will satisfy that condition.

In block 88 of FIG. 8, other eligible macroblocks are retrieved from storage and deblocked using the second deblocker of FIG. 4. That is, the macroblock M+1 that immediately follows the current macroblock M in encoding order can also be deblocked if macroblock M+1 has previously been decoded and stored. Once macroblock M+1 is deblocked, the macroblock M+2 that immediately follows macroblock M+1 in encoding order can be deblocked if it has been previously decoded and stored, and so on. In one embodiment, each macroblock that is eligible for deblocking is flagged in an array such as the array of FIGS. 7A-7D. Additional information is also provided in conjunction with FIG. 9, below.

In block 89 of FIG. 8, if the current macroblock M (which is now equivalent to the last deblocked macroblock Last_Db_MB) is not the last macroblock in the frame, then the flowchart returns to block 82. Otherwise, the frame is completely decoded.

Figure 9:
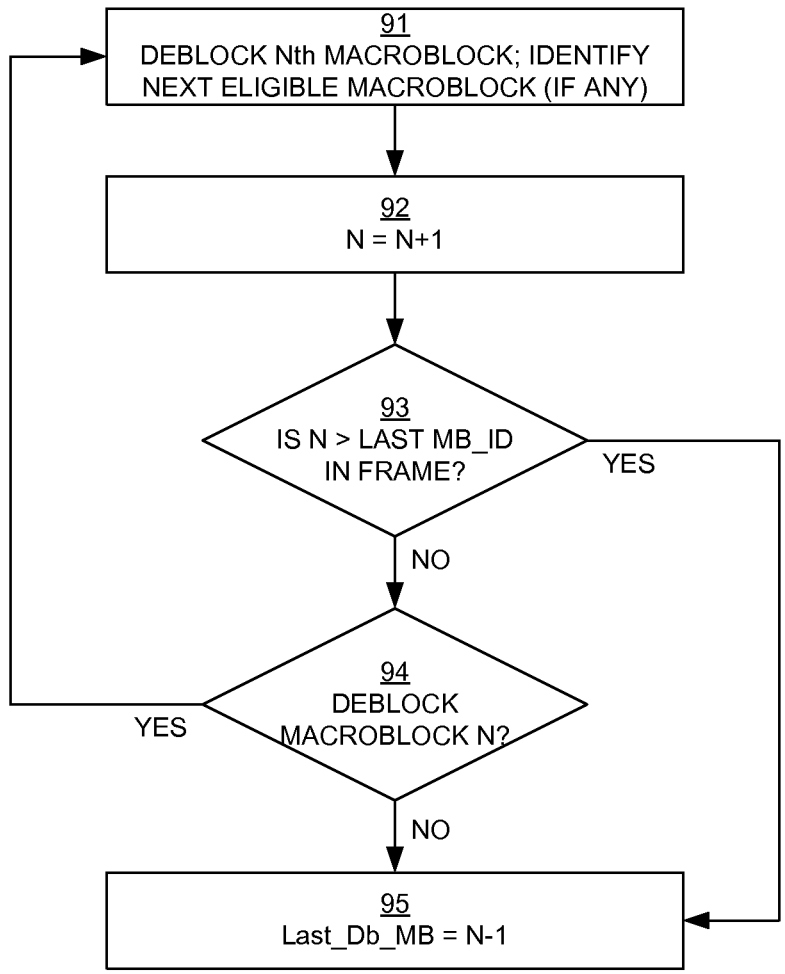
FIG. 9 is a flowchart of an example of a computer-implemented method for identifying macroblocks eligible for deblocking according to an embodiment of the invention.

FIG. 9 is a flowchart of a computer-implemented method for deblocking eligible macroblocks according to an embodiment of the invention. In block 91, the Nth macroblock in the frame is deblocked, and other macroblocks that are eligible for deblocking are identified. In one embodiment, an array such as the array of FIGS. 7A-7D is accessed to identify eligible macroblocks.

In block 92 of FIG. 9, the macroblock number for the last (most recently) deblocked macroblock (the macroblock deblocked in block 91) is incremented by one (N=N+1). In block 93, if the current value of N is greater than the macroblock number for the last macroblock in the frame, then the flowchart advances to block 95; otherwise, the flowchart proceeds to block 94.

In block 94, the bit value in the array corresponding to the current macroblock is read. If the bit value is set (e.g., equal to one), then the current macroblock can be deblocked, the flowchart returns to block 91, and the current macroblock is deblocked. Otherwise, the flowchart proceeds to block 95.

In block 95, the value of Last_Db_MB (defined as above) is set to the current value of N decremented by one (N−1), and the value of Last_Db_MB is returned and utilized as described in conjunction with FIG. 8.

Thus, according to an embodiment of the invention, macroblocks can be deblocked as soon as they are eligible to be deblocked. On-the-spot deblocking can be achieved for some macroblocks that are in an out-of-order (e.g., ASO/FMO) frame. Accordingly, the amount of bus traffic can be reduced because it is not necessary to transfer all macroblocks in such a frame to and from memory, and the amount of memory consumed is also reduced. Furthermore, computing time can be reduced because decoding and deblocking can be accomplished in parallel—while one macroblock is being decoded, another macroblock can be deblocked.

Figure 10:
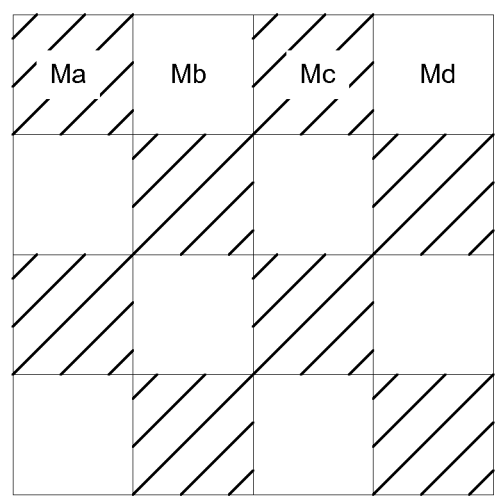
FIG. 10 is an example of an out-of-order frame that can be deblocked according to embodiments of the invention.

For example, FIG. 10 illustrates a portion of a frame in which macroblocks in a first slice (represented using shaded blocks) are interspersed with macroblocks in a second slice (represented using unshaded blocks) in a checkerboard pattern. The first slice is sent to the decoder first, followed by the second slice—the frame is therefore an ASO/FMO frame. During decoding, the first (top left) macroblock Ma can be deblocked on-the-spot, but the other shaded blocks are stored before deblocking. When the macroblocks in the second (unshaded) slice are decoded, every macroblock in the second slice can be deblocked immediately after it is decoded, and every macroblock in the first slice can be fetched in order from memory and deblocked. More specifically, macroblock Mb can be deblocked on-the-spot because it relies only on macroblock Ma being deblocked; macroblock Mc can then be retrieved from memory and deblocked; macroblock Md can be deblocked on-the-spot, and so on. Therefore, it is not necessary to store the macroblocks in the second slice before deblocking; only the macroblocks in the first slice (except macroblock Ma) are stored before deblocking. Thus, in this example, less than half of the macroblocks in the frame are stored before deblocking, and traffic across a bus to and from memory is also reduced by about half.

Because motion compensation can take more time to complete than deblocking, the deblocking stage of a decoding pipeline may be idle at times (e.g., it may be starved for data). However, with on-the-spot deblocking, the deblocking stage can use the idle time to process stored macroblocks, reducing the total decoding time compared to a conventional two-pass implementation.

In addition, ASO/FMO frames can be detected on-the-fly. While achieving at least the same performance for decoding in-order frames as conventional implementations, decoding of out-of-order frames is significantly improved. Moreover, a single decoder architecture can be used to process in-order/out-of-order reference/non-reference frames—the path through the decoder is adaptively selected based on the type of frame being processed.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method of processing frames of data in a decoder, the method comprising:
    receiving encoded frames as inputs to a first stage of the decoder;
    decoding the encoded frames in the first stage to produce decoded frames, the encoded frames comprising an encoded first frame and the decoded frames comprising a decoded first frame produced using the encoded first frame, the decoding comprising decoding an encoded first macroblock in the encoded first frame to produce a decoded first macroblock comprising the decoded first macroblock;
    forwarding the decoded first frame from the first stage to a second stage of the decoder, wherein the second stage comprises a first deblocker and a second deblocker that are operable for deblocking different decoded frames in parallel and at the same time; and
    deblocking the decoded first macroblock in parallel with decoding another encoded macroblock in the encoded first frame provided a decoded second macroblock relied upon for the deblocking is already deblocked, and otherwise storing the decoded first macroblock in memory prior to the deblocking.

2. The method of claim 1 further comprising associating information with the decoded first macroblock to indicate whether the decoded first macroblock is deblocked.

3. The method of claim 1 further comprising:
    initializing an array, wherein the array comprises a bit value for each macroblock in the decoded first frame; and
    setting a bit value in the array to indicate whether the decoded first macroblock has been deblocked.

4. The method of claim 1 wherein the decoded second macroblock is adjacent to the decoded first macroblock within the decoded first frame.

5. The method of claim 1 further comprising:
    associating a first macroblock number with the decoded first macroblock; and
    associating a second macroblock number with the decoded second macroblock, wherein the first and second macroblock numbers are consecutive values.

6. The method of claim 1 further comprising:
    accessing the decoded first macroblock in the memory after the decoded second macroblock is deblocked; and
    deblocking the decoded first macroblock.

7. The method of claim 6 further comprising:
    identifying a decoded third macroblock that relies upon the decoded first macroblock for deblocking; and
    deblocking the decoded third macroblock after the decoded first macroblock is deblocked.

8. The method of claim 1 further comprising deblocking a decoded second frame in parallel with the deblocking of the decoded first frame.

9. The method of claim 1 further comprising deblocking the decoded first frame using the first deblocker if the decoded first frame is identified as a first type of frame and deblocking the decoded first frame using the second deblocker if the decoded first frame is identified as a second type of frame.

10. A computer system comprising:
a decoder pipeline comprising a decoding stage followed by a downstream deblocking stage, the decoding stage operable for decoding encoded frames to produce decoded frames, the encoded frames comprising an encoded first frame and the decoded frames comprising a decoded first frame produced using the encoded first frame, the decoded first frame comprising a decoded first macroblock and the deblocking stage comprising a first deblocker and a second deblocker that are operable for deblocking different decoded frames in parallel and concurrently; and
a memory coupled to the decoder pipeline; wherein the decoded first macroblock is output from the decoding stage directly into the deblocking stage, bypassing the memory, if a decoded second macroblock depended upon to deblock the decoded first macroblock is already deblocked, wherein otherwise the decoded first macroblock is stored in the memory until the decoded second macroblock is deblocked and available to deblock the decoded first macroblock; wherein the decoded first macroblock is deblocked in parallel with decoding another encoded macroblock in the frame provided the decoded second macroblock is already deblocked, wherein otherwise the decoded first macroblock is stored in the memory prior to being deblocked.

11. The computer system of claim 10 wherein the decoded first macroblock is flagged when stored in the memory to indicate that the decoded first macroblock is not deblocked.

12. The computer system of claim 10 wherein the decoded second macroblock is adjacent to the decoded first macroblock within the decoded first frame.

13. The computer system of claim 10 wherein the decoded first macroblock is associated with a first macroblock number and the decoded second macroblock is associated with a second macroblock number, wherein the first and second macroblock numbers are consecutive values.

14. The computer system of claim 10 wherein, after the decoded first macroblock is deblocked, the deblocking stage deblocks any decoded macroblock that depends on the decoded first macroblock for deblocking.

15. A memory having computer-executable instructions stored thereon for performing a method of processing a frame comprising video data, the method comprising:
receiving encoded frames as inputs to a decoding stage of a decoder pipeline;
decoding the encoded frames in the decoding stage to produce decoded frames, the encoded frames comprising an encoded first frame and the decoded frames comprising a decoded first frame produced using the encoded first frame, the decoding comprising decoding an encoded first macroblock in the encoded first frame to produce a decoded first macroblock and decoding an encoded second macroblock in the encoded first frame to produce a decoded second macroblock;
accessing a first macroblock number associated with the decoded first macroblock;
comparing the first macroblock number to a second macroblock number associated with the decoded second macroblock, wherein the decoded second macroblock immediately precedes the decoded first macroblock in processing order in the decoder pipeline;
forwarding the decoded first macroblock to a deblocking stage in the decoder pipeline if the first and second macroblock numbers are consecutive numbers and otherwise storing the decoded first macroblock in a memory coupled to the decoder pipeline, wherein the deblocking stage comprises a first deblocker and a second deblocker that are operable for deblocking different decoded frames in parallel and at the same time; and
deblocking the decoded first macroblock in parallel with decoding another encoded macroblock in the encoded first frame provided the decoded second macroblock relied upon for the deblocking is already deblocked, and otherwise storing the decoded first macroblock in the memory prior to the deblocking.

16. The memory of claim 15 wherein the method further comprises:
initializing an array, wherein the array comprises a bit value for each macroblock in the decoded first frame; and
setting a bit value in the array to indicate that the decoded first macroblock has not been deblocked.

17. The memory of claim 15 wherein the method further comprises:
accessing the decoded first macroblock in the memory after the decoded second macroblock is deblocked; and
deblocking the decoded first macroblock.

18. The memory of claim 17 wherein the method further comprises:
identifying a decoded third macroblock that relies upon the decoded first macroblock for deblocking; and
deblocking the decoded third macroblock after the decoded first macroblock is deblocked.

19. The memory of claim 15 wherein the method further comprises:
accessing an array, wherein the array comprises a plurality of flag bits and wherein each decoded macroblock in the decoded first frame is associated with a respective one of the flag bits, wherein the flag bits are set to identify decoded macroblocks that have not been deblocked;
identifying a plurality of decoded macroblocks having flag bits that are set and also having consecutive macroblock numbers, wherein the consecutive macroblock numbers include a third macroblock number that is consecutive with the first macroblock number; and
deblocking the plurality of decoded macroblocks after the decoded first macroblock is deblocked.

* * * * *